United States Patent
Boecker et al.

(10) Patent No.: US 8,721,956 B2
(45) Date of Patent: May 13, 2014

(54) METHOD OF FORMING A FLUID RECEPTACLE

(75) Inventors: Albert J. Boecker, Ettlingen (DE); Andreas W. Dobmaier, Karlsruhe (DE); Alex Ehler, Rastatt (DE); Peter Grauer, Steinweiler (DE); Matthias B. Olbrich, Trimbach (FR); Bernd Weber, Kuppenheim (DE)

(73) Assignee: TI Automotive Technology Center GmbH, Rastatt (DE)

( * ) Notice: Subject to any disclaimer, the term of this patent is extended or adjusted under 35 U.S.C. 154(b) by 247 days.

(21) Appl. No.: 13/038,936

(22) Filed: Mar. 2, 2011

(65) Prior Publication Data

US 2011/0215102 A1    Sep. 8, 2011

Related U.S. Application Data

(60) Provisional application No. 61/310,053, filed on Mar. 3, 2010.

(51) Int. Cl.
*B29C 49/18*    (2006.01)

(52) U.S. Cl.
USPC .................... 264/510; 264/515; 264/523

(58) Field of Classification Search
None
See application file for complete search history.

(56) References Cited

U.S. PATENT DOCUMENTS

| | | | |
|---|---|---|---|
| 3,113,831 A * | 12/1963 | Coale | 264/512 |
| 4,952,347 A | 8/1990 | Kasugai | |
| 5,554,422 A | 9/1996 | Gill et al. | |
| 5,589,241 A | 12/1996 | Stiles et al. | |
| 5,885,515 A | 3/1999 | Hudkins | |
| 6,033,749 A | 3/2000 | Hata et al. | |
| 6,440,353 B1 | 8/2002 | Hutchins | |
| 6,485,668 B1 | 11/2002 | Murphy et al. | |
| 6,645,421 B1 * | 11/2003 | Sanderson et al. | 264/513 |
| 6,712,234 B2 | 3/2004 | Boecker | |
| 6,808,673 B2 | 10/2004 | Van Schaftingen | |
| 6,866,812 B2 | 3/2005 | Van Schaftingen et al. | |
| 6,893,603 B2 | 5/2005 | Rohde et al. | |
| 6,916,442 B2 | 7/2005 | Dupont et al. | |
| 6,969,246 B1 | 11/2005 | Kundinger et al. | |
| 7,097,445 B2 | 8/2006 | Brandner et al. | |
| 7,387,699 B2 | 6/2008 | Ideno et al. | |
| 2001/0013516 A1 * | 8/2001 | Boecker | 220/562 |
| 2002/0051856 A1 * | 5/2002 | Delbarre | 428/36.6 |
| 2002/0105115 A1 | 8/2002 | Sadr | |
| 2002/0110658 A1 | 8/2002 | Lucke et al. | |
| 2003/0198768 A1 | 10/2003 | Delbarre | |
| 2005/0040566 A1 | 2/2005 | Knueppel et al. | |
| 2005/0040567 A1 | 2/2005 | Knueppel et al. | |
| 2005/0104260 A1 | 5/2005 | Van Schaftingen et al. | |
| 2008/0038497 A1 | 2/2008 | Nemoto | |

FOREIGN PATENT DOCUMENTS

| | | |
|---|---|---|
| DE | 10231866 A1 | 1/2004 |
| DE | 102006031902 A1 | 1/2008 |
| EP | 0087828 A1 | 9/1983 |
| EP | 1334817 A1 | 8/2003 |
| EP | 2141000 A2 | 6/2010 |
| JP | 2006103116 | 4/2006 |
| WO | WO0015418 A1 | 3/2000 |
| WO | WO2004007182 A1 | 1/2004 |

* cited by examiner

*Primary Examiner* — Monica Huson
(74) *Attorney, Agent, or Firm* — Reising Ethington P.C.

(57) ABSTRACT

A fluid receptacle may include an outer wall defining a periphery of the fluid receptacle, and an inner wall. The inner wall may be connected to the outer wall at certain locations and spaced from the outer wall at other locations providing gaps between the outer wall and the inner wall. In some implementations, the inner wall may be complete or continuous and liquid fuel may be contained within the inner wall. In other implementations, liquid fuel may be received between the inner and outer walls.

15 Claims, 5 Drawing Sheets

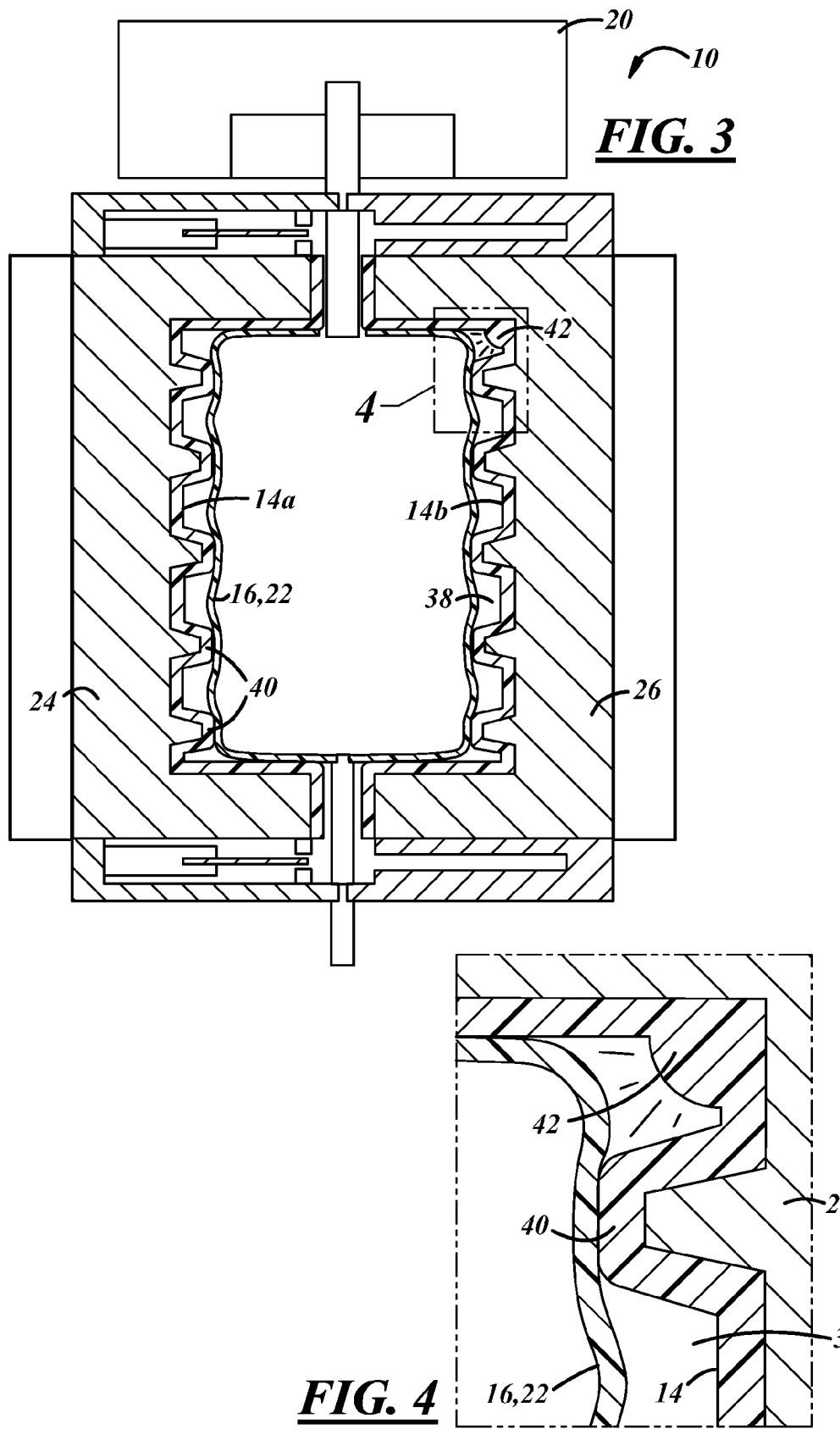

METHOD OF FORMING A FLUID RECEPTACLE

REFERENCE TO COPENDING APPLICATION

This application claims the benefit of U.S. Provisional Patent Application Ser. No. 61/310,053 filed Mar. 3, 2010, which is incorporated herein by reference in its entirety.

TECHNICAL FIELD

The present disclosure relates generally to fluid receptacles, such as fuel tanks.

BACKGROUND

Fuel tanks for automotive vehicles have been made from metal and plastic materials. Fuel tanks are formed in various sizes and shapes as required for the various applications in which they are used. Fuel tanks used in passenger vehicles must meet certain requirements relating to, for example, resistance to rupture upon impact and permeability to hydrocarbons in fuel vapor. Typical plastic fuel tanks include a single wall or material and that wall may be formed from a single material or multiple layers of different materials.

SUMMARY

A fluid receptacle may include an outer wall defining a periphery of the fluid receptacle, and an inner wall. The inner wall may be connected to the outer wall at certain locations and spaced from the outer wall at other locations providing gaps between the outer wall and the inner wall. In some implementations, the inner wall may be complete or continuous and liquid may be contained within the inner wall. In other implementations, liquid may be received between the inner and outer walls.

A method of forming a fluid receptacle may include forming an outer wall, forming an inner wall, providing at least a portion of the inner wall within the outer wall, and blow molding the outer wall and inner wall in a mold to provide an outer wall defining a periphery of the fluid receptacle and the inner wall connected to the outer wall at certain locations and spaced from the outer wall at other locations.

BRIEF DESCRIPTION OF THE DRAWINGS

The following detailed description of preferred embodiments and best mode will be set forth with reference to the accompanying drawings, in which:

FIG. 3 is a diagrammatic view of the apparatus of FIG. 2 shown after the mold halves are closed and after partial blow-molding of the parison for the inner wall;

FIG. 4 is an enlarged fragmentary view of the portion of the apparatus within the rectangle 4 in FIG. 3;

DETAILED DESCRIPTION OF PREFERRED EMBODIMENTS

Figure 1:
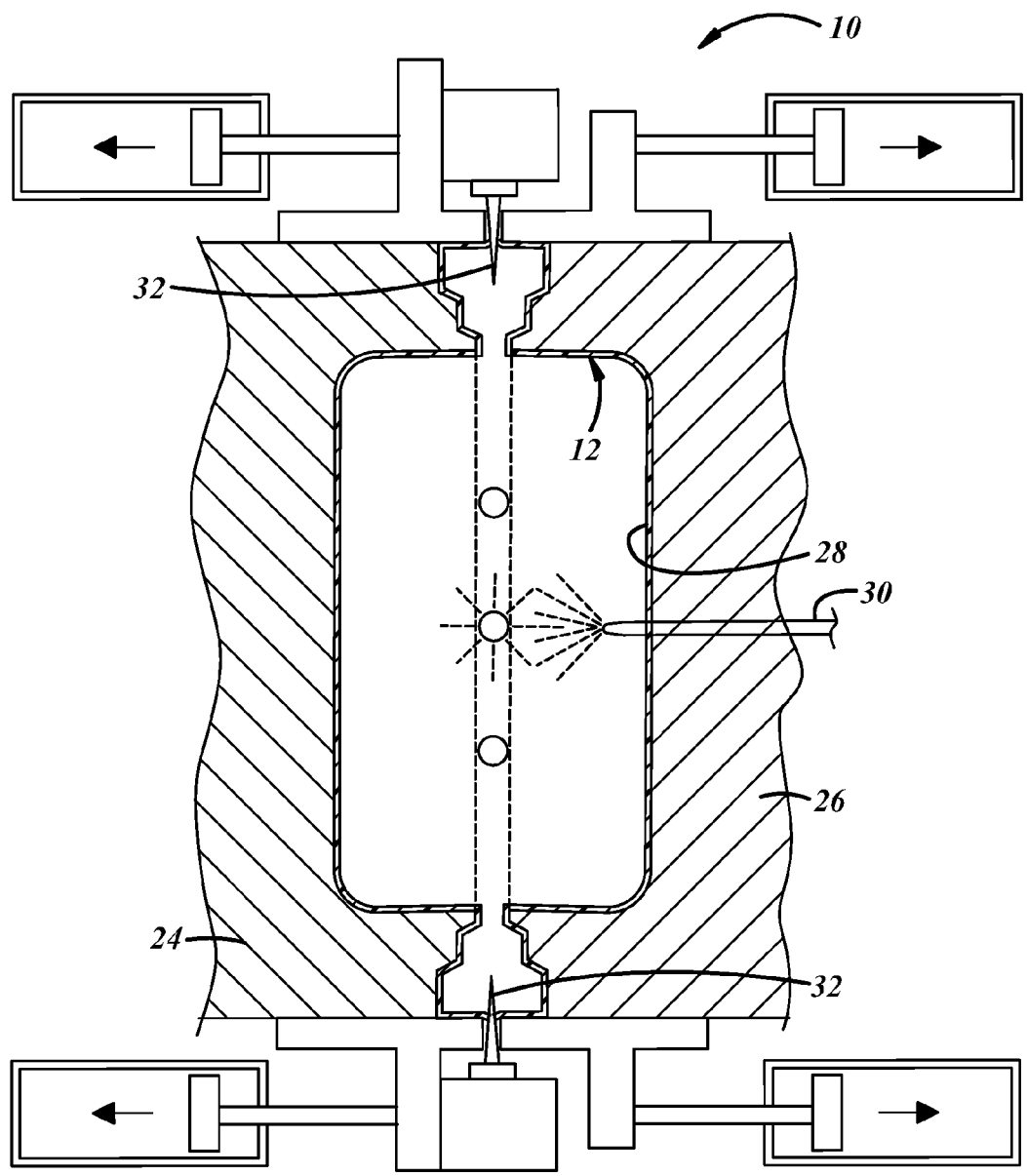
FIG. 1 is a diagrammatic sectional view of an apparatus for forming a polymeric receptacle.
Figure 5:
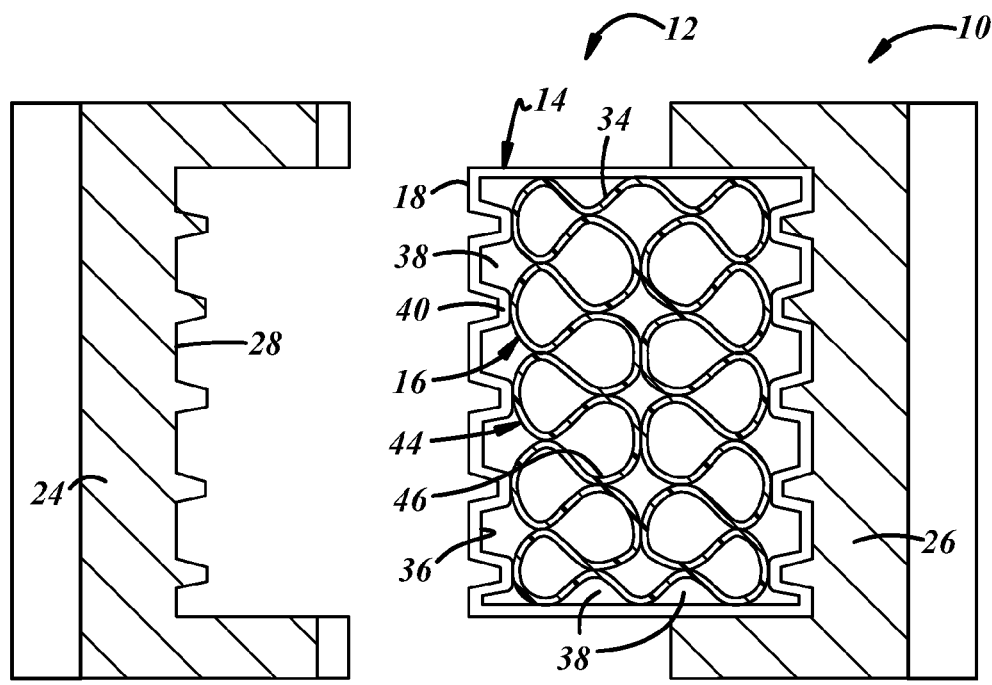
FIG. 5 is a diagrammatic view of the apparatus illustrating, in section, a double-walled receptacle within open mold halves.

Referring in more detail to the drawings, FIG. 1 shows an apparatus 10 that may be used to form a receptacle, such as a fuel tank 12, that has more than one wall. As shown in FIG. 5, the fuel tank 12 may have, for example, an outer wall 14 and an inner wall 16 disposed within the outer wall. The outer wall 14 may have an outer surface 18 that defines an outer periphery of the fuel tank 12, and, if desired, the inner wall 16 may be completely enclosed within the outer wall 14. The outer wall 14 and inner wall 16 may each be formed from a single layer of material, or one or both of them may be formed from multiple layers of material joined together. Representative multi-layer walls may include inner and outer structural layers (e.g. formed of HDPE), a vapor barrier layer between the structural layers and formed of a material having high resistance to permeation of hydrocarbons therethrough, (e.g. a nylon or EVOH material) and adhesive layers between the structural layers and the vapor barrier layers to facilitate bonding together of all the layers. Of course, any suitable materials and any desired number of layers and arrangement of layers may be used for the outer wall 14 and the inner wall 16. In at least some implementations, both the outer wall 14 and the inner wall 16 may include vapor barrier layers. In these implementations, when the inner wall 16 defines an inner volume of the fuel tank 12 in which fuel is stored, two complete vapor barrier layers may be provided (one in each wall) to reduce hydrocarbon permeation through the fuel tank 12.

The apparatus 10 may include an extruder 20 (FIGS. 2 and 3), and one or more molds 24, 26 having forming surfaces 28 against which, for example, the outer wall 14 of the fuel tank 12 may be formed. To form one or both of the outer and inner walls 14, 16, one or more molten parisons 22 may be discharged from the extruder 20 and provided between halves 24, 26 of the mold, when the mold is open. Upon closing the mold halves 24, 26, a blow pin 30 may be provided within the parison 22 and closed mold to provide a pressurized fluid, like air, into the parison 22 to expand the parison 22 within the mold. FIG. 1 generally illustrates the outer wall 14 of the fuel tank 12 being initially or pre-molded in this way. In this implementation, a cutter 32 (FIG. 1) may then be used to sever the outer wall 14 into two sections or halves 14a, 14b (FIG. 2) generally along the parting line of the mold halves 24, 26. The mold halves 24, 26 and outer wall halves 14a, 14b may then be opened or separated providing access to the interior of the outer wall 14. The material for the inner wall 16 may then be positioned between and/or within the outer wall halves 14a, 14b.

The inner wall 16 could be provided in the form of an already molded structure that is partially or fully cooled and hardened. Upon closing the molds with the outer wall sections 14a, 14b still somewhat molten, the outer wall 14 may bond, weld, be welded, or melt to the inner wall 16 to join them together. The inner wall 16 may include an outer surface 34 or periphery that is not of the same shape as the inner surface 36 of the outer wall 14. Accordingly, when the mold is closed, the outer wall 14 may contact the inner wall 16 only at selected locations with gaps 38 (see e.g., FIG. 5) provided between the inner wall 16 and outer wall 14 at other locations.

Figure 2:
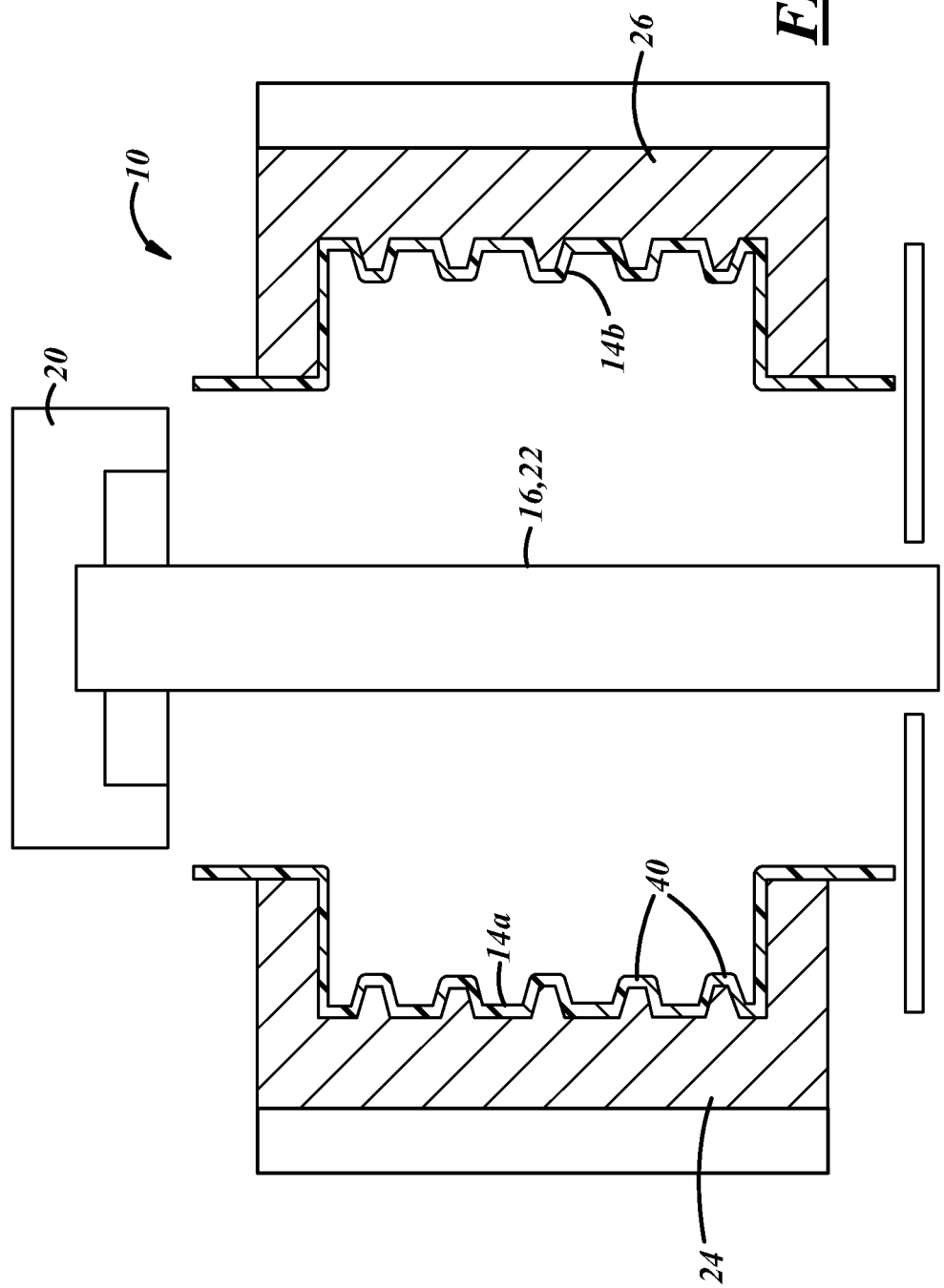
FIG. 2 is a diagrammatic view of the apparatus of FIG. 1 showing an outer wall separated into halves and a parison for an inner wall disposed between the outer wall halves and open mold halves.

Alternatively, as shown in FIG. 2, the inner wall 16 may be provided in the form of a molten parison 22, and may be provided from the same extruder 20 as the outer wall 14. The inner wall parison 22 may be disposed generally between the outer wall halves 14a, 14b when the mold halves 24, 26 are open as previously described. In this implementation, the mold halves 24, 26 may then be closed as shown in FIG. 3 to trap the inner wall parison 22 within the outer wall portions 14a, 14b and mold halves. Upon closing the molds, the outer wall halves 14a, 14b may become bonded, welded, melted together, or otherwise connected together to form a single, continuous and complete outer wall 14. Prior to closing the molds or as they are closed, the blow pin 30 may be inserted into the inner wall parison 22 so that pressurized air may be injected into the inner wall parison to expand the parison into contact with the outer wall 14. The at least somewhat molten outer and inner walls 14, 16 bond, weld, are welded or melt bond together to firmly connect the outer and inner walls 14, 16. In whatever form or process of molding, connection features like ribs 40, knobs or the like can be defined in one or both of the outer and inner walls 14, 16, or extra components (e.g. components not integral with or formed from the same piece of material as the inner or outer walls) can be inserted between the walls 14, 16 to facilitate connecting the walls together. The connection features 40 or other non-planar portions of the outer wall may improve the rigidity and strength of the outer wall as compared to a flat, generally planar wall. In at least some implementations, the connection features may include indentations in the outer wall, or outwardly extending portions of the inner wall, or both. Of course, other arrangements are possible. For example, slots or other voids may be provided in one wall with the material of the other wall received in or covering the void to facilitate connection between the inner and outer walls. The non-planar portions may be in the area of the connection features and in the area of one or more points or locations of connection between the inner and outer walls.

As the inner wall parison 22 is expanded, air may become trapped between the outer and inner walls 14, 16. This air may become pressurized and hence, drive the outer wall 14 toward the mold halves 24, 26 to finally mold and form the outer wall 14. In another implementation, supplemental or additional pressurized air may be provided between the outer and inner walls 14, 16 to further control the final molding of the outer and inner walls 14, 16 and to, for example, ensure desired locations or sizes of air pockets or gaps 38 between the walls. This may be accomplished with a second outlet in the main blow pin 30, or with one or more secondary blow pin(s) 42 (FIGS. 3 and 4). The pressure between the outer and inner walls 14, 16 could then be controlled, as desired, to be greater or less than the pressure provided within the inner wall parison 22. In at least these ways, final blow molding of the outer and inner walls 14, 16 may occur at generally the same time.

Upon contacting the mold, the outer wall 14 may cool more quickly than the inner wall 16 which, in at least some implementations, does not directly contact the mold halves 24, 26. Accordingly, as the outer wall cools and hardens, the inner wall 16 may remain more pliable or molten such that the inner wall could be further formed or moved if desired. In one exemplary process, the blow molding pressure may be reduced so that the inner wall 16 deforms further and relative to the outer wall 14. The deformation of the inner wall 16 may be driven, at least in part, by the air pressure in the pockets or gaps 38 between the outer wall 14 and inner wall 16. This deformation may provide some bulbs, curved sections, waves or other non-planar sections 44 between the connection points of the outer and inner walls 14, 16. In this way, at least some of the sections of the inner wall 16 between two points of connection to the outer wall 14 are not planar or straight and are instead contoured or curved between the connection points. These deformed or contoured sections 44 may provide increased strength and stiffness to the inner wall 16. As shown in FIG. 5, in at least some implementations, the inner wall may engage and bond to itself at one or more points 46. The inner wall may be bonded to itself at one or more locations spaced from a location where the inner and outer walls are connected together.

As noted above, air pockets or gaps 38 may be formed between the walls where the outer and inner walls 14, 16 are not directly connected together. Hence, the double walled tank 12 may include areas where the outer and inner walls 14, 16 are connected and areas where the walls are spaced apart. In some implementations, these gaps 38 may be filled with foam or some other material to increase the stiffness, strength, temperature insulation, noise isolation/damping, of for any other reason. The gaps, in at least certain implementations, may be formed between adjacent connection features of one or both of the inner and outer walls.

Figure 6:
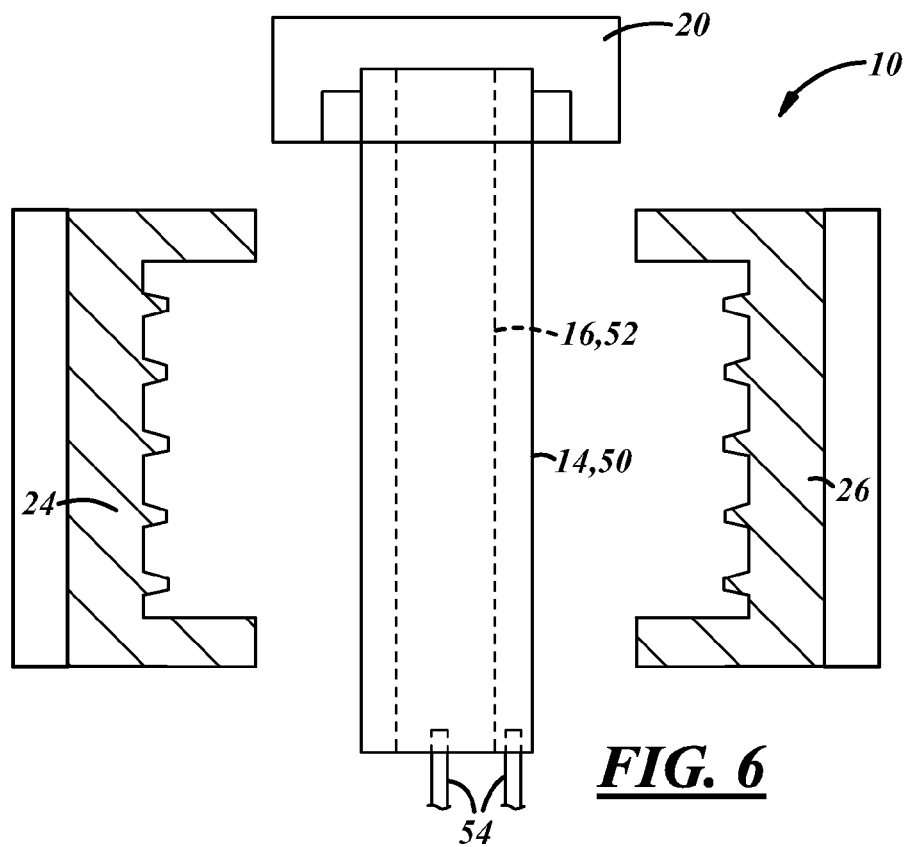
FIG. 6 is a diagrammatic view of an apparatus for forming a receptacle using an alternate molding process.

As another alternative, as shown in FIG. 6, the outer and inner walls 14, 16 may be formed from coaxial parisons 50, 52 or where one parison is received within another (e.g. not necessarily coaxial). The parisons 50, 52 may be extruded at the same time, or at different times, and may be positioned together between the mold halves 24, 26 prior to closing the mold. One or more blow pins 54 may provide a pressurized fluid, like air, within the inner wall parison 52 and/or between the parisons 50, 52 to maintain them separate, at least in the areas of intended gaps 38. After the mold halves 24, 26 are closed together, the molding process in this implementation may be the same as that wherein the inner mold parison 22 is positioned between pre-molded halves 14a, 14b of the outer wall 14, as shown in FIGS. 2 and 3.

The areas of connection between the walls 14, 16, and/or in the inner wall 16 itself, may improve the structural integrity of the fuel tank 12. Accordingly, the areas of connection may be provided in weaker areas of one or both of the outer and inner walls 14, 16 to reinforce those areas. For example, more areas of connection may be provided in areas of the inner wall 16 and/or outer wall 14 where there is a significant surface area that is generally flat or planar. The gaps 38 may isolate and insulate the contents of the inner wall 16 (e.g. fuel) from the surrounding environment. Such insulation may include sound isolation (e.g. quieting the noise of sloshing and splashing fuel) and temperature insulation.

The outer wall 14 may have an average thickness between about 2 mm to 10 mm thick and the inner wall 16 may also have an average thickness between about 2 mm to 10 mm thick. In one form, the combined average thickness of the walls 14, 16 may be about 10 mm with the outer wall 14 and inner wall each being about 5 mm thick. In such an example, the same extruder head may be used to form each wall, although that is not necessary. Especially when the inner wall 16 is continuous and used to contain the liquid fuel such that fuel is not normally between the outer and inner walls 14, 16, providing two walls can decrease the likelihood that fuel will leak from the tank 12 during a vehicle accident or other incident where the tank 12 is contacted by another component or object. This is true because even if the outer wall 14 is punctured or ruptured, the inner wall 16 may not be such that the fuel is still retained within the tank 12. Further, the inner wall 16 may significantly reduce fuel sloshing and hence, hydrocarbon vapor production, within the tank as compared to a single wall fuel tank 12. This further reduces hydrocarbon emissions from the tank. The inner wall may be sized to closely fit within the entire interior of the outer wall, or just a portion thereof. In at least some applications, the volume of the inner wall may be between about 40% to 95% of the volume defined by the inner surface of the outer wall.

Structural elements may be provided on one or both of the inner and outer walls, or between the walls. In the implementation shown in FIG. 7, structural elements 60 are received between the outer wall 62 and the inner wall 64. The structural elements 60 may provide structural reinforcement to one or both of the inner and outer walls. The structural elements may also or instead provide other functions, like venting of the enclosure defined by the inner wall, the space(s) between the inner and outer walls, or both. The structural elements 60 could also include fluid routing components, like one or more pumps, fluid transfer lines, connectors, filters, etc.

Figure 7:
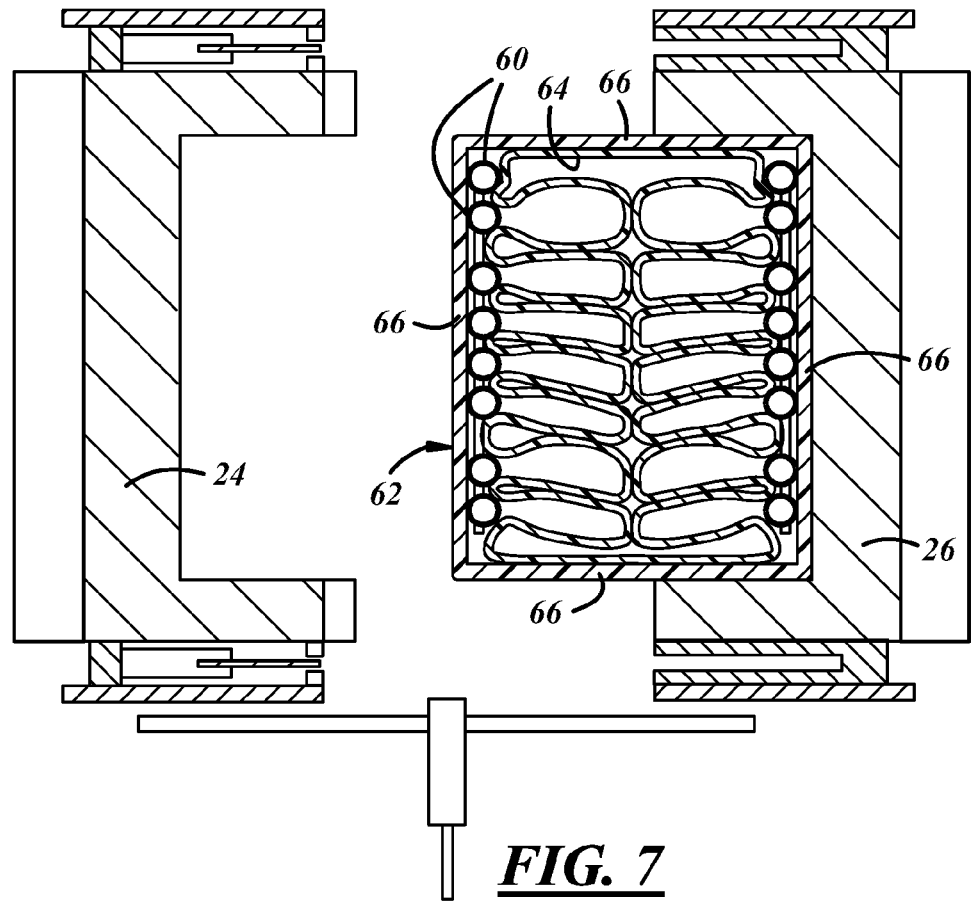
FIG. 7 is a diagrammatic view of an apparatus for forming a receptacle having structural elements between inner and outer walls.

In the implementation of FIG. 7, the structural elements 60 provide at least some reinforcement of the receptacle and permit, by way of example, the outer wall 62 to be formed with a relatively simple shape. That is, the outer wall 62 as shown has generally planar sidewalls 66 which can be made of relatively thin material, even though the generally planar walls are not as strong as walls with ribs, corners, bends, or the like. In FIG. 7, the structural elements 60 include a web or series of spaced apart and interconnected or separate tubes that are bonded or otherwise connected to the inner and outer walls. The structural elements may define points of connection between or otherwise interconnect the outer wall 62 and inner wall 64. The tubes, or other structural elements 60 that may be provided, may be hollow or solid, rigid or flexible and of any size and shape desired. In this way, the molds for the outer wall may have a simple shape which may facilitate manufacture of the outer wall, reduce tooling costs, improve material uniformity in the outer wall, and permit use of a thinner wall because there are fewer corners or other areas where the outer wall is stretched, folded or bent and where the material may tend to become thinner during the forming or molding process.

Figure 8:
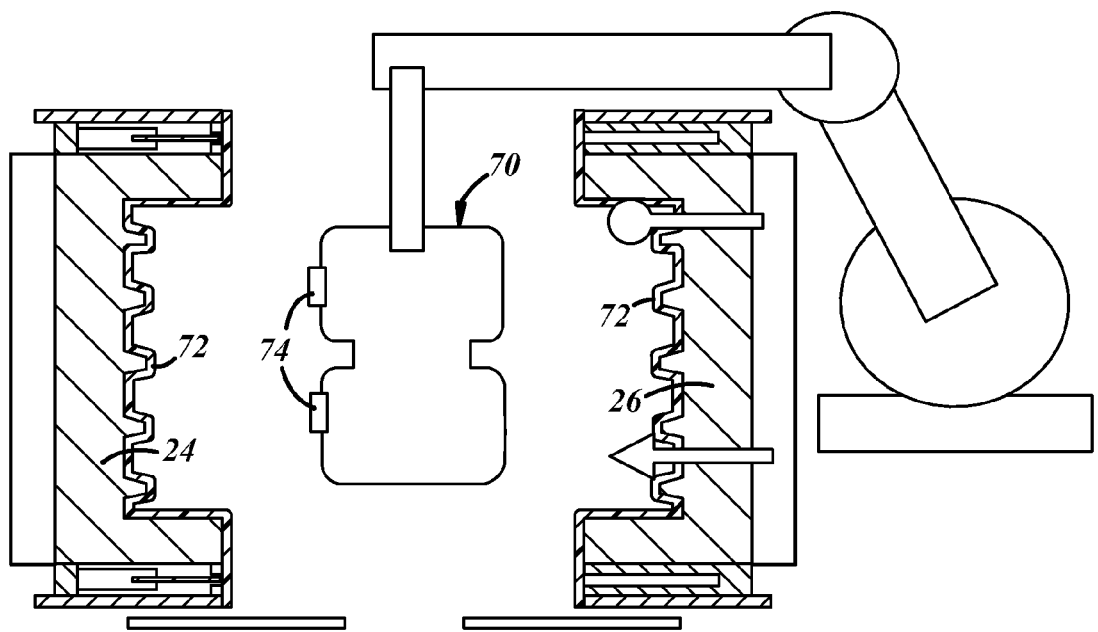
FIG. 8 is a diagrammatic view of an apparatus for forming a receptacle having a preformed inner receptacle and an outer wall formed around the inner receptacle.

In the implementation shown in FIG. 8, the inner wall is defined at least in part by a preformed receptacle 70. The outer wall 72 is then provided around or enclosing at least a portion of the preformed receptacle 70 to provide a receptacle with inner and outer walls. The preformed receptacle 70 may be formed in any suitable way, such as by way of example without limitation, injection molding or blow molding. In at least some implementations, the preformed receptacle 70 is formed into its final shape prior to being combined with or disposed within the outer wall 72. That is, the preformed receptacle, in at least some implementations, does not significantly change shape when combined with the outer wall as described below.

The preformed receptacle 70 may still be warm from its production process or it may be preheated prior to being introduced within the outer wall 72. The preformed receptacle 70 may have any desired shape and may include, if desired, various components 74 for use with the fluid being contained. The various components may include, for example, pumps, tubes, filters, and vent lines and valves. These components may be disposed within the preformed receptacle, outside of the receptacle (and adapted to be at least partially received between the inner and outer walls) or both.

To form this receptacle, the outer wall 72 may be formed as described above where the material of the outer wall is initially expanded into the mold halves 24, 26, cut or otherwise torn or severed, the mold halves 24, 26 are then opened and the preformed receptacle 70 may be disposed between the open mold halves. The mold halves 24, 26 may then be closed together and the outer wall 72 finally formed and joined to the preformed receptacle 70.

The preformed receptacle 70 and the outer wall 72 may be formed of any suitable materials and may be of any size and shape desired. The preformed receptacle and/or the outer wall may include various structural features to improve the stiffness of the walls as noted herein. In addition or instead, structural elements may be provided on or in one or both of the inner and outer walls, or between them. In at least some implementations, for example but not limited to, an automotive vehicle fuel tank, each of the inner and outer walls 70, 72 may be between about 2 mm and 6 mm in thickness.

The inner and outer walls, and the opportunity for improved stiffness features in one or both of the walls, may provide a stronger, stiffer fluid receptacle. The fluid receptacle may be readily adapted for use in a system where the receptacle is pressurized. And, where permeation resistance is important, both the inner and outer walls can be formed of or include materials that resist vapor permeation therethrough providing two separate layers of permeation resistant material. Further, venting devices or components can be placed in, on or between the inner and outer walls to control vapor flow and limit vapor escaping from the fluid receptacle.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method of forming a fluid receptacle, comprising:
blow molding a first molten parison in a closed mold to form an outer wall defining a periphery of the fluid receptacle;
separating the outer wall into at least two sections;
opening the mold;
disposing a second molten parison in the open mold and between the outer wall sections;
closing the mold to connect together the separated outer wall sections; and
blow molding an inner wall at least in part within the outer wall and with the inner wall connected to the outer wall at certain locations and spaced apart from the outer wall at other locations and for receiving a fluid within the inner wall.

2. A method of forming a fluid receptacle comprising:
blow molding an outer wall within a mold to define a periphery of a fluid receptacle and then separating the outer wall into two portions so that the mold can be opened;
disposing an inner wall within the mold and between the two portions of the outer wall before the inner wall is blow molded; and
blow molding the inner wall in the mold to connect the inner wall to the outer wall at certain locations and spaced from the outer wall at other locations.

3. The method of claim 2 wherein a pressurized fluid is provided within the inner wall and between the inner wall and outer wall as the inner wall is blow molded.

4. A method of forming a fluid receptacle, comprising:
forming an outer wall from a cylindrical parison;
forming an inner wall from a cylindrical parison disposed within the parison of the outer wall;
blow molding the outer wall and inner wall in a mold to provide an outer wall defining a periphery of the fluid receptacle and an inner wall connected to the outer wall at certain locations and spaced from the outer wall at other locations;

the inner wall and outer wall are blow molded at substantially the same time and pressurized fluid is provided within the inner wall and between the inner wall and outer wall during the blow molding process; and a plurality of air pockets are formed between the outer wall and the inner wall prior to final blow molding of the inner wall so that, upon blow molding the inner wall, the outer wall is moved into contact with the mold and thereby molded with the air pockets remaining between the inner and outer walls.

5. A method of forming a fluid receptacle, comprising:

blow molding an outer wall in a mold;

separating the outer wall into at least two portions to expose an interior of the outer wall;

providing a preformed receptacle into the interior of the outer wall to define an inner wall of the receptacle for receiving a fluid therein;

closing the outer wall portions around the preformed receptacle; and blow molding the outer wall portions in the mold to provide an outer wall defining a periphery of the fluid receptacle and the inner wall connected to the outer wall at least in certain locations and spaced from the outer wall at other locations to form a plurality of pockets between the outer wall and the inner wall.

6. The method of claim 1 wherein the inner wall is blow molded to the outer wall in at least some of the locations in which the inner and outer walls are connected.

7. The method of claim 1 wherein the inner wall defines an interior volume in which hydrocarbon fuel is stored.

8. The method of claim 7 wherein the inner wall includes at least one vapor barrier layer.

9. The method of claim 1 wherein the outer wall includes at least one vapor barrier layer.

10. The method of claim 7 wherein the inner wall and the outer wall are each formed with multiple layers of polymer materials.

11. The method of claim 1 wherein the thickness of the blow molded outer wall averages 2 mm to 10 mm.

12. The method of claim 1 wherein the average thickness of the blow molded outer wall plus the average thickness of the blow molded inner wall is 5 mm to 10 mm.

13. The method of claim 1 wherein the volume enclosed by the inner wall is 40% to 95% of the volume enclosed by the inner surface of the outer wall.

14. The method of claim 1 which also comprises disposing structural elements between the inner wall and the outer wall and connected to at least one of the inner wall and the outer wall.

15. The method of claim 5 which also comprises bonding together the outer wall portions to provide a single and continuous outer wall.

* * * * *